United States Patent [19]

Peterson

[11] 3,857,942

[45] Dec. 31, 1974

[54] SEED PROTECTORS

[75] Inventor: Donald J. Peterson, Springfield Township, Hamilton County, Ohio

[73] Assignee: The Proctor & Gamble Company, Cincinnati, Ohio

[22] Filed: June 30, 1971

[21] Appl. No.: 158,529

[52] U.S. Cl.................... 424/245, 424/288, 47/57.6
[51] Int. Cl............................................... A01n 9/00
[58] Field of Search .............. 424/288, 245; 47/57.6

[56] References Cited
UNITED STATES PATENTS 3,031,483   4/1962   Martinus............................ 424/288
3,097,999   7/1963   Martinus............................ 424/288

Primary Examiner—Albert T. Meyers
Assistant Examiner—Douglas W. Robinson
Attorney, Agent, or Firm—Jack D. Schaeffer; Richard C. Witte; Thomas H. O'Flaherty

[57] ABSTRACT

A process for protecting seeds from fungi employing certain (thiomethyl)triorganotin, (organosulfonylmethyl)triorganotin, and (N,N-disubstituted aminomethyl)triorganotin compounds.

4 Claims, No Drawings

SEED PROTECTORS

BACKGROUND OF THE INVENTION

This invention relates to processes and compositions for protecting seeds against phytopathogenic fungi, especially those of the genus Fusarium.

The necessity for applying various fungicides to seeds to prevent a variety of fungal diseases is clearly accepted and substantial quantities of seed protecting agents are used each year. Plant seeds infested by phytopathogenic fungi do not germinate and grow. Hence, various fungicides are used to treat, or "dress," seeds to prevent infection by soil pathogens, especially fungi of the genus Fusarium.

Heretofore, most fungicides used on a broad scale as seed protectors have been derivatives of mercury. However, present concern with the organomercurials has been expressed due to their persistence and the uptake of toxic mercury residues by treated seeds. Other non-metallic fungicides have been suggested for use in treating seeds; see for example, U.S. Pat. No. 3,546,813, Frohberger, et al., Dec. 15, 1970. None of the currently used seed "dressings" satisfy all the requirements for an ideal material, including low cost, ease of application, low phytotoxicity, good fungicidal or fungistatic activity and non-toxic residues.

It is an object of this invention to provide a method for combatting fungal infestation of seeds using organotin compounds which exhibit a high fungicidal power against various plant fungi, especially the phytopathogenic fungi of the genus Fusarium, but which have only slight mammalian toxicity and which leave substantially non-toxic residues. It is a further object herein to provide seeds dressed with organotin fungicides of the type hereinafter disclosed, said seeds having substantially increased percentages of germination over non-dressed seeds when planted in soil infested with phytopathogenic fungi, especially of the genus Fusarium. These and other objects are obtained herein as will be seen from the following disclosure.

The organotin compounds used in the present process and methods for their preparation are more fully described in U.S. Pat. No. 3,723,089 issued Mar. 27, 1973 to Donald Peterson; U.S. Pat. No. 3,725,446 issued Apr. 3, 1973 to Donald Peterson; and the Peterson application Ser. No. 10,303, filed Feb. 10, 1970, now abandoned, incorporated herein by reference.

SUMMARY OF THE INVENTION

The present invention encompasses a method for protecting seeds from fungal infestation comprising applying an effective amount of one or more organotin compounds of the type hereinafter described to said seeds. By "applying" herein is meant that the organotin compound is sprayed, brushed or dusted onto the seeds. When seeds are coated with the organotin compounds, the term commonly used is "dressed." Organotin seed dressings can be conveniently applied by soaking or dusting the seeds with the compositions containing the organotin compounds described herein. While the process herein is suitable for combatting all manner of fungi on seeds, especially the phytopathogenic fungi, it is especially preferred for combatting fungi of the genus Fusarium.

The present invention also encompasses seeds dressed with an effective amount of the organotin compounds in the manner of this invention. When planted, such seeds exhibit a substantially increased percentage of germination and growth over untreated seeds due to their lack of infestation by phytopathogenic fungi, especially those of the genus Fusarium.

DETAILED DESCRIPTION OF THE INVENTION

According to the present method, the infestation of plant seeds by various plant fungi is prevented or substantially decreased by applying a fungi-controlling amount of an organotin compound selected from the group consisting of (thiomethyl)triorganotin compounds, (organosulfonylmethyl)triorganotin compounds, and (N,N-disubstituted aminomethyl)triorganotin compounds of the type hereinafter described. Seeds dressed with any of the aforementioned classes or organotin compounds are protected against phytopathogenic fungi, especially those of the genus Fusarium.

The organotin compounds useful in the process of this invention are more fully described in the Peterson Patents and application above, and have been disclosed for use in combatting certain fungal infections in animals. The (thiomethyl)triorganotin compounds suitable for use herein as seed dressings are more fully described in U.S. Pat. No. 3,725,446 (above), incorporated herein by reference. These compounds are of the formula $R-S-CH_2-Sn-R^1_3$ wherein R is alkyl of from 1 to 14 carbon atoms; aryl; or substituted aryl; and each $R^1$ is alkyl of from 1 to 14 carbon atoms.

The (organosulfonylmethyl)triorganotin compounds useful in the present process are more fully described in the application of Peterson, entitled "Novel Organotin Compounds" (above), incorporated herein by reference. These compounds are of the general formula

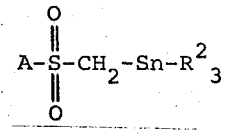

wherein A is alkyl of from 1 to 14 carbon atoms; aryl; substituted aryl; or $R_2^3N-$ wherein each $R^3$ is alkyl of from 1 to 14 carbon atoms; and each $R^2$ is alkyl of 1 to 14 carbon atoms; or aryl. These compounds are prepared by reacting an organometallic compound having the formula:

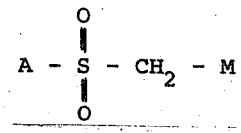

wherein M is alkaline metal and A is as defined above, with a trihydrocarbyltin halide.

The (N,N-disubstituted aminomethyl)triorganotin compounds useful herein are more fully described in the U.S. Pat. No. 3,723,089 (above), incorporated herein by reference. These amino-methyltin compounds are of the general formula $R_2^4NCH_2SnR_3^5$ and $R^6R_2^{4+NCH}{}_2SnR_3^5X^-$ wherein each $R^4$ is a straight or branched chain, saturated or unsaturated aliphatic group having from 1 to about 14 carbon atoms, or both $R^4$'s taken together form a heterocyclic ring containing 4 to 7 carbon atoms, $R^5$ is a straight or branched chain, saturated or unsaturated aliphatic group having from 1 to about 14 carbon atoms, $R^6$ is hydrogen or a straight or branched chain, saturated or unsaturated aliphatic group having from 1 to about 14 carbon atoms, and X is a salt forming anion, e.g., halide. The aforementioned organotin compounds useful herein are prepared from triorganotin halides and certain organometallic compounds in the manner fully described in the foregoing Peterson applications.

Exemplary (thiomethyl)triorganotin compounds suitable for use as seed protectors in the manner of the present invention include (methylthiomethyl)tributyltin, (phenyl-thiomethyl)tributyltin, (decylthiomethyl)tributyltin, (naphthylthiomethyl)tributyltin, (methylthiomethyl)trimethyl tin, (p-tolylthiomethyl)tributyltin, (methylthiomethyl)tridecyltin, (decylthiomethyl)tridecyltin and the like. Exemplary (organosulfonylmethyl)triorganotin compounds suitable for use in the present process include (phenylsulfonylmethyl)tributyltin, (phenylsulfonylmethyl)triphenyltin, (p-methoxyphenylsulfonylmethyl)tributyltin, (decylsulfonylmethyl)tributyltin, (decylsulfonylmethyl)triphenyltin, (methylsulfonylmethyl)trimethyltin, (naphthylsulfonylmethyl)tridecyltin, (N,N-dimethylaminosulfonylmethyl)tributyltin, and the like. Exemplary (N,N-disubstituted aminomethyl)triorganotin compounds suitable for use herein include (N,N-dimethylaminomethyl)tributyltin, (cyclopentamethylenaminomethyl)tributyltin, (N,N-diethylaminomethyl)tri-isopropyltin, (N,N-di-isopentylaminomethyl)tripropyltin, (N,N-dibutylaminomethyl)trioctyltin, (N,N-dihexylaminomethyl)tridodecyltin, (N,N-didodecylaminomethyl)trihexyltin, (N,N-diethylaminomethyl)-tri(3-pentenyl)tin, (N,N-dipropylaminomethyl)triethyltin and the like. Organotin compounds preferred for use as seed protectors in the manner of this invention include any of the (phenylsulfonylmethyl)trialkyltins, especially (phenylsulfonylmethyl)tributyltin. Also preferred herein are (N,N-dimethylaminosulfonylmethyl)tributyltin and (N,N-dimethylaminomethyl)tributyltin.

The organotin compounds used in the manner of this invention can be applied to plant seeds to protect against all manner of fungi. For example, all manner of fungi of the genus Fusarium, especially *Rhizoctonia sp.* and *Pythium sp.*, are controlled by application of the organotin compounds of the types hereinabove disclosed to seeds.

Fungal infestation in all manner of plant seeds can be combatted by application of the organotin compounds herein. For example, seed corn, cottonseed, wheat seed, oat seed, barley seed, pea seed, and soybean seed can be dressed with organotin compounds in the manner of this invention and are protected from fungal infestation, especially by fungi of the genus Fusarium.

The hereinabove disclosed organotin compounds can be applied alone to seeds as dressings. Alternatively, the organotin compounds used in the manner of this invention can be incorporated into seed dressing compositions comprising an inert carrier and an effective, i.e., fungi controlling, amount of one or more of the organotin compounds. (As used herein an inert carrier is defined as a solvent or a dry bulking agent which has no substantial fungicidal, fungistatic or phytotoxic properties but which provides a means whereby the organotin compounds can be diluted for convenient application.) Such dressing compositions enable the organotin compounds to be applied conveniently to the seeds in any desired quantity. These compositions can be solids, such as dusts, granules or wettable powders, or they can be liquids such as solutions, aerosols or emulsifiable concentrates. The solid compositions generally contain from about 1 percent to about 95 percent by weight of the organotin compounds and the liquid compositions generally contain from about 0.5 percent to about 70 percent by weight of said compounds.

Dusts can be prepared by grinding and blending the organotin compounds with a solid inert carrier such as the talcs, clays, silicas, pyrophylite and the like. Granular formulations can be prepared by impregnating the organotin compounds, usually dissolved in a suitable solvent, onto and into granulated carriers such as the attapulgites or the vermiculites, usually of a particle size range of from about 0.3 to about 1.5 mm, or by coating an inert carrier with a wettable powder formulation of the compounds. Wettable powders, which can be dispersed in water or oil to any desired concentration of the organotin compounds, can be prepared by incorporating wetting agents into concentrated dust compositions or by simply mixing the ingredients in the case of some of the organotin salts.

Some of the organotin compounds used in the present invention are sufficiently soluble in water or the common organic solvents such as kerosene, xylene, Stoddard Solvent, acetone, and the like, that they can be used directly as solutions in these solvents. Frequently, these solutions of organotin compound can be dispersed under super-atmospheric pressure as aerosols onto the seeds being dressed. Other liquid compositions for the practice of this invention are emulsifiable concentrates which comprise the organotin compound, an emulsifier, and, as an inert carrier, an organic solvent of the type noted below. Such concentrates can be extended with water and/or oil to any desired concentration of the organotin compound for application to the seeds. The emulsifiers used in these concentrates are surface active agents of the anionic, nonionic, cationic, ampholytic or zwitterionic type and normally comprise from about 0.1 to about 30 percent by weight of the concentrate. Examples of suitable anionic surface active agents are sodium salts of fatty alcohol sulfates having from 8–18 carbon atoms in the fatty chain and sodium salts of alkyl benzene sulfonates, having from 9 to 15 carbon atoms in the alkyl chain. Examples of suitable nonionic surface active agents are the polyethylene oxide condensates of alkyl phenols, wherein the alkyl chain contains from about 6 to 12 carbon atoms and the amount of ethylene oxide condensed onto each mole of alkyl phenol is from about 5 to 25 moles. Examples of suitable cationic surface active agents are dimethyl dialkyl quaternary ammonium salts wherein the alkyl chains contain from about 8 to 18 carbon atoms and the salt forming anion is a halogen. Examples of suitable ampholytic surface active agents are derivatives of aliphatic secondary or tertiary amines in which one of the aliphatic substituents contains from about 8 to 18 carbon atoms and one contains an anionic water solubilizing group, e.g., sulfate or sulfonate. Specific suitable ampholytic surface active agents are sodium-3-dodecylaminopropionate and sodium-3-dodecylaminopropane sulfonate. Examples of suitable zwitterionic surface active agents are derivatives of aliphatic quaternary ammonium compounds in which one of the aliphatic constituents contains from about 8 to 18 carbon atoms and one contains an anionic water solubilizing group. Specific examples of zwitterionic surface active agents are 3-(N,N-dimethyl-N- hexadecylammonio)propane-1-sulfonate and 3-(N,N-dimethyl-N-hexadecylammonio)2-hydroxypropane-1-sulfonate. Many other suitable surface active agents are described in "Detergents and Emulsifiers - 1969 Annual," by John W. McCutcheon, Inc., incorporated herein by reference. Suitable solvents for these emulsifiable concentrates include hydrocarbons such as benzene, toluene, xylene, kerosene and Stoddard Solvent and halogenated hydrocarbons such as chlorobenzene, chloroform, fluorotrichloromethane and dichlorodifluoromethane.

The organotin compounds of the type used in the present process can be conveniently applied to seeds either alone, in combination one with another, or in conjunction with a carrier as hereinabove disclosed using various commercially available seed treatment apparatus. For example, the batch-type treater, e.g., the familiar rotary batch treater, can be employed for this purpose. Small batches of vegetable seed can be treated by shaking together with the organotin compounds in a glass jar. Various well-known gravity type feeders and continuous-flow dust treaters can also be employed. Slurry treaters can be conveniently used to apply the organotin compounds formulated as wettable dusts as described hereinabove. The liquid compositions containing the organotin compounds can be applied with various commercial drum treaters, mist treaters and continuous-type spray treaters. Bulbs and corms as well as potato seed-pieces (all of which are encompassed by the term "seed" herein) are conveniently treated by dipping in the liquid seed dressing compositions containing the organotin compounds.

The organotin compounds of the type hereinabove disclosed are applied to seeds at concentrations from about 0.001 pound to about 1 pound, preferably about 0.01 pound to about 0.20 pound, per bushel of seed being dressed. Application rates can vary somewhat with the type of soil, the level of infestation by phytopathogenic fungi, and the expense of the seed being dressed. That is to say, it is economically feasible to apply higher concentrations of the organotin compounds to more expensive seeds and bulbs, thereby assuring almost 100 percent germination, than when using less expensive seeds where lower percentages of germination can be balanced by higher concentrations of seeds being planted. However, application rates of greater than about 1 pound of the organotin compound per bushel (i.e. −1 lb./100 lbs. seed) represent an economic waste in that this rate insures almost complete protection of the seed.

The following examples are intended to illustrate the processes and dressed seeds of this invention but are not intended to be limiting thereof. The organotin compounds used in the examples are prepared in the manner of Peterson, above.

EXAMPLE I

*Pythium sp.* and *Rhizoctonia sp.* organisms were thoroughly mixed with soil prepared from three parts loam and two parts sand. Organotin compounds were applied to pea seeds, dry, at the rate of 1 ⅔ ounces per 100 pounds of seed by milling with the organotin compounds dissolved in acetone in a dry ball mill. A small flat of 100 treated seeds was used in each test and a negative control with uninfested soil and seeds and a control flat with fungus infested soil and untreated seeds were included in the test. Seeds treated with ethylmercury-p-toluene sulfonanilide, a commerical seed dressing, at 1 ⅔ ounces per 100 pounds of seed, were also included in the test. The seed flats were watered uniformly and maintained for 1 week in a controlled temperature and humidity environment. The percentage of germinating and growing plants was recorded after two weeks.

Organotin seed protectors applied to pea seeds and tested in the foregoing manner gave the results indicated in Table I.

| Treatment | Percentage Growing Pea Plants |
|---|---|
| (phenylsulfonylmethyl)tributyltin | 70 |
| (N,N-dimethylaminosulfonylmethyl)-tributyltin | 31 |
| (N,N-dimethylaminomethyl)tributyltin | 11 |
| ethylmercury-p-toluene sulfonanilide | 22 |
| infested soil, no treatment | 0 |
| uninfested soil and seed, no treatment | 96 |

From the foregoing it may be seen that representative organotin compounds of the type herein disclosed applied to seeds provide effective seed dressings.

In the above procedure, the pea seeds are replaced by seed corn, oat seed, wheat seed, barley seed, and rye seed and the seeds are protected against *Pythium* and *Rhizoctonia* and exhibit substantially increased percentages of germination over untreated seeds infested with these fungi.

The above organotin compounds are applied to seeds at a rate of 0.001 pound per bushel and 1 pound per 100 pounds of seed, respectively, and the dressed seeds are substantially protected from infestation by fungi of the genus Fusarium.

EXAMPLE II

A composition comprising 1 lb. of (phenylsulfonylmethyl)tributyltin dissolved in 500 gallons of 10:1 (wt.) acetonewater is prepared. Narcissus bulbs and iris bulbs are dipped for five minutes in the (phenylsulfonylmethyl)tributyltin solution and are substantially protected from basal rot caused by *Fusarium oxysporum*. Lily bulbs dipped in the (phenylsulfonylmethyl)tributyltin solution are protected against black scale caused by *Collectotrichum lilli*.

Dipping the true root used as a seed piece for sweet potatoes in the above solution of (phenylsulfonylmethyl)tributyltin provides control of black rot caused by *Ceratostomella fimbriata*.

Seed pieces of the potato (*Solanum tuberosum L.*) are dipped in the above organotin seed dressing and control of black leg (seed piece rot) by *Erwinia carotovra* is obtained.

In the above procedure, the (phenylsulfonylmethyl)-tributyltin is replaced by an equal amount of (N,N-dimethylaminosulfonylmethyl)tributyltin, (N,N-dimethylaminomethyl)tributyltin and (methylthiomethyl)tributyltin, respectively, and equivalent results are secured.

EXAMPLE III

A wettable powder comprising 50 percent by weight of Bentonite clay, 10 percent polyoxyethylene sorbitan mono-oleate, 5 percent by weight of (phenylsulfonylmethyl)tributyltin, 10 percent acetone, balance water is prepared. Two pounds of the wettable powered seed dressing is admixed with 1 bushel of oats and milled in a rotary drum for about 1 hour. The oats are planted and are substantially protected from Victoria blight.

In the foregoing procedure, the oats are replaced by an equivalent amount of barley and the barley seeds are protected against Helminthosporium seedling blight.

Wheat seed dressed with the foregoing seed dressing is protected against wheat bunt.

EXAMPLE IV

Wheat seed (1 bushel) and ½ oz. of (phenylsulfonylmethyl)tributyltin are admixed in a rotary drum and rotated for about 1 hour. Each wheat seed (about 500,000 seeds per bushel) is uniformly coated and each seed receives about $5 \times 10^{-5}$ ounce of the (phenylsulfonylmethyl)tributyltin seed dressing. Wheat seeds dressed in this fashion are substantially protected against all manner of fungi, especially those of the genus Fusarium.

In the foregoing procedure, the wheat seed is replaced by an equivalent amount of oat seed, barley seed, rye seed, rice seed, and pea seeds, respectively, and equivalent results are secured.

In the above procedure, the (phenylsulfonylmethyl)tributyltin is replaced by an equivalent amount of (N,N-dimethylaminosulfonylmethyl)tributyltin, (N,N-dimethylaminomethyl)tributyltin, (methylthiomethyl)tridecyltin, (p-methoxyphenylsulfonylmethyl)tributyltin, (naphthylsulfonylmethyl)tridecyltin, (N,N-dihexlaminomethyl)tridodecyltin, (N,N-diethylaminomethyl)tri(3-pentenyl)tin, and (cyclopentamethylenaminomethyl)tributyltin, respectively, and equivalent dressed seeds are secured. The dressed seeds are protected against infestation by phytopathogenic fungi, especially those of the genus Fusarium, and exhibit substantially enhanced percentages of germination over untreated seeds when planted.

What is claimed is:

1. A process for protecting plant seeds from fungal infestation comprising applying to said plant seeds a fungicidally effective amount of an organotin compound selected from the group consisting of compounds of the formulas:

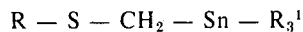

wherein R is selected from the group consisting of $C_1$ to $C_{10}$ alkyl, phenyl, naphthyl, and tolyl; and $R^1$ is $C_1$ to $C_{10}$ alkyl;

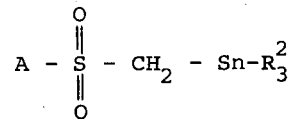

wherein A is selected from the group consisting of $C_1$ to $C_{10}$ alkyl, phenyl, methoxyphenyl, naphthyl, and N,N-dimethylamino; and $R^2$ is selected from the group consisting of $C_1$ to $C_{10}$ alkyl, and phenyl; and

wherein each $R^4$ is $C_1$ to $C_{12}$ alkyl; or both $R^4$'s taken together form a cyclopentomethylene ring; and $R^5$ is $C_2$ to $C_{12}$ alkyl.

2. A process according to claim 1 wherein the organotin compound is selected from the group consisting of (phenylsulfonylmethyl)tribytyltin, (N,N-dimethylaminosulfonylmethyl)tributyltin, and (N,N-dimethylaminomethyl)tributyltin.

3. A process according to claim 1 wherein the organotin compound is applied to the seeds at a concentration from about 0.001 lb. to about 1 lb. per bushel of seed.

4. A process according to claim 1 wherein the seed is selected from the group consisting of seed corn, cottonseed, wheat seed, oat seed, barley seed, pea seed, soybean seed, and potato seed-pieces.

* * * * *